United States Patent [19]

Beveridge

[11] Patent Number: 4,771,542
[45] Date of Patent: Sep. 20, 1988

[54] HAND-HOLDABLE ELECTRIC RECIPROCATING CUTTING TOOL

[75] Inventor: Robert J. Beveridge, Pittington, England

[73] Assignee: Black & Decker Inc., Newark, Del.

[21] Appl. No.: 909,003

[22] Filed: Sep. 18, 1986

[30] Foreign Application Priority Data

Sep. 23, 1985 [GB] United Kingdom ............... 8523425

[51] Int. Cl.⁴ .......................................... B23D 49/04
[52] U.S. Cl. ................................. 30/392; 30/272 A; 83/824
[58] Field of Search ............. 30/392, 393, 394, 272 A; 83/824

[56] References Cited

U.S. PATENT DOCUMENTS

| | | | |
|---|---|---|---|
| 2,911,711 | 11/1959 | Knoll | 30/272 A |
| 3,448,781 | 6/1969 | Angelucci | 30/392 |
| 3,505,733 | 4/1970 | Holden | 30/166 |
| 3,640,280 | 2/1972 | Slanken et al. | 30/392 X |
| 4,665,618 | 5/1987 | Leini | 30/392 |

FOREIGN PATENT DOCUMENTS 848776 11/1939 France .
416971 7/1966 Switzerland .

OTHER PUBLICATIONS

European Search Report.

*Primary Examiner*—E. R. Kazenske
*Assistant Examiner*—Willmon Fridie
*Attorney, Agent, or Firm*—Edward D. Murphy; Harold Weinstein; Edward D. C. Bartlett

[57] ABSTRACT

A hand-held power cutting tool has a generally cylindrical casing, which can be grasped in the palm of one hand, and whose rear portion housed an electric driving motor disposed in the casing with its axis of rotation lying along the longitudinal axis of the rear portion. Reciprocated by the motor via a drive transmission system is a cutter carrier mounted for reciprocatory movement in a bearing support structure. The cutter carrier carries a clamp by which a cutter is attached to the carrier. The carrier is reciprocated at a rate of between 4,000 and 12,000 movements per minute and with a stroke of from 4 to 12 mm for rapid cutting of thin material. The cutter may have a generally U-shaped blade.

19 Claims, 17 Drawing Sheets

HAND-HOLDABLE ELECTRIC RECIPROCATING CUTTING TOOL

FIELD OF THE INVENTION

This invention relates to power tools and has particular reference to a hand-holdable, power tool adapted to operate with a variety of cutting blades for cutting a wide range of different materials.

BACKGROUND OF THE INVENTION

Applicant has appreciated that the reciprocatory movement imparted to a cutter tool should be sufficiently rapid to effect cutting without resulting in overheating of the cutting blade and damage to the material being cut. Furthermore, applicant has appreciated that the stroke of the cutting tool also plays an important part in effective cutting. The stroke should be sufficient to ensure cutting and yet not result in excessive vibration of the tool particularly when hand-held.

These conflicting requirements for a hand-held cutting tool have not been satisfactorily met in the past.

SUMMARY OF THE INVENTION

It is an object of the present invention to provide a hand-holdable power reciprocating cutting tool that better satisfies the above requirements, particularly a small tool that can be grasped in the palm of one hand such as a padsaw.

Accordingly, therefore, there is provided by the present invention a power tool comprising a drive motor coupled by a drive transmission system to a cutter carrier characterized in that the motor in conjunction with the transmission system is adapted to impart to the carrier a reciprocatory motion of a stroke of from 4 to 12 mm and at a rate in the range of 4,000-12,000 (both limits included) reciprocatory movements per minute.

Preferably, the stroke lies within the range of from 6-10 mm (both limits included).

The rate may lie within the range of from 7,000 to 12,000 movements (both limits included) per minute but preferably is within the range 8,500 to 10,000 (both limits included).

In one particular embodiment of the invention, the stroke is 8 mm and the rate of reciprocation either 8,500 or 10,000 movements per minute.

The tool may have a casing of generally cylindrical form sized to allow a user to hold and manipulate the tool during use by grasping the casing.

The casing may accommodate the drive motor which is so orientated that its longitudinal axis—the axis of rotation—lies along the longitudinal axis of the casing.

The carrier may be mounted for reciprocatory movement along an axis extending in the same direction as the axis of the casing.

The drive motor may occupy a rear cylindrical portion of the casing whilst the transmission system occupies a forward part of the casing.

The transmission system may comprise a bracket rotatably supporting an eccentric by means of which reciprocatory movement is imparted to the carrier.

The bracket may also support a thrust bearing for supporting axial loads applied to the eccentric.

The carrier may be mounted for reciprocatory movement in spaced bearings supported by a support structure comprising separable members each with spaced support surfaces for supporting the bearings.

The carrier may be accommodated entirely within the casing and remains so during reciprocation of the member.

The carrier may be aligned with an aperture in the forward face of the casing and carries a work piece clamp at that end adjacent the forward face.

The casing may be apertured in the vicinity of the clamp to give access to the latter.

The casing may have a slide movable between a position in which the aperture is exposed and another position in which the slide covers the aperture.

In another aspect of the present invention, a power tool has a casing of a clam shell construction and includes a first cylindrical portion sized to allow it to be grasped and held by a user's hand, and a second portion extending from the first portion, the first portion accommodating a drive motor assembly with a longitudinal axis lying along the longitudinal axis of the first portion, the second portion accommodating a cutter carrier mounted for reciprocatory movement in the direction of the longitudinal axis of the first portion and accommodating a drive transmission system interconnecting the motor and the drive member for imparting reciprocatory movement to the latter.

The drive motor may be an electric motor.

BRIEF DESCRIPTION OF THE DRAWINGS

By way of example only, preferred embodiments of the invention will now be described in greater detail with reference to the accompanying drawings of which:

FIGS. 21-24 are side elevations of other forms of cutting tool.

DETAILED DESCRIPTION OF THE PREFERRED EMBODIMENTS

The embodiment is a hand-held, powered cutting tool with a casing 1 of elongate generally-cylindrical form. The casing is of a clam shell construction comprising body halves 2, 3 of a plastics material. The halves have mating edge configurations and are held together by screws 4 that pass through apertures in one body half and into holes in bosses in the other body half.

The casing 1 has a rear portion 5 of generally cylindrical shape and of a diameter that enables this portion to the casing to be readily grasped by the hand of a user to use the tool.

Figure 3:
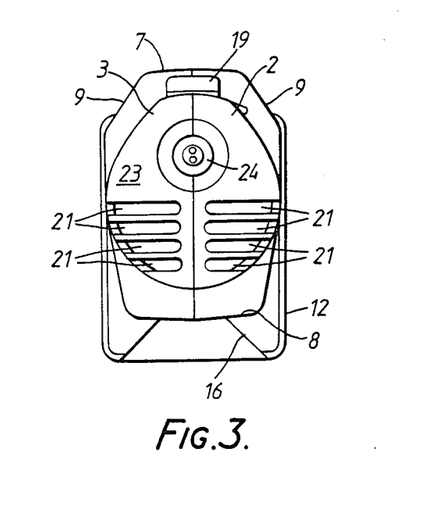

The rear portion 5 merges smoothly into a front portion 6 of slightly larger top-to-bottom dimensions than portion 5 and with flat top and bottom surfaces 7, 8 and angled shoulders 9 as can be seen in FIG. 3. The forward wall 10 of the front portion 6 is angled downwardly as at 11 to a flat nose to which is secured a front guard 12.

Figure 1:
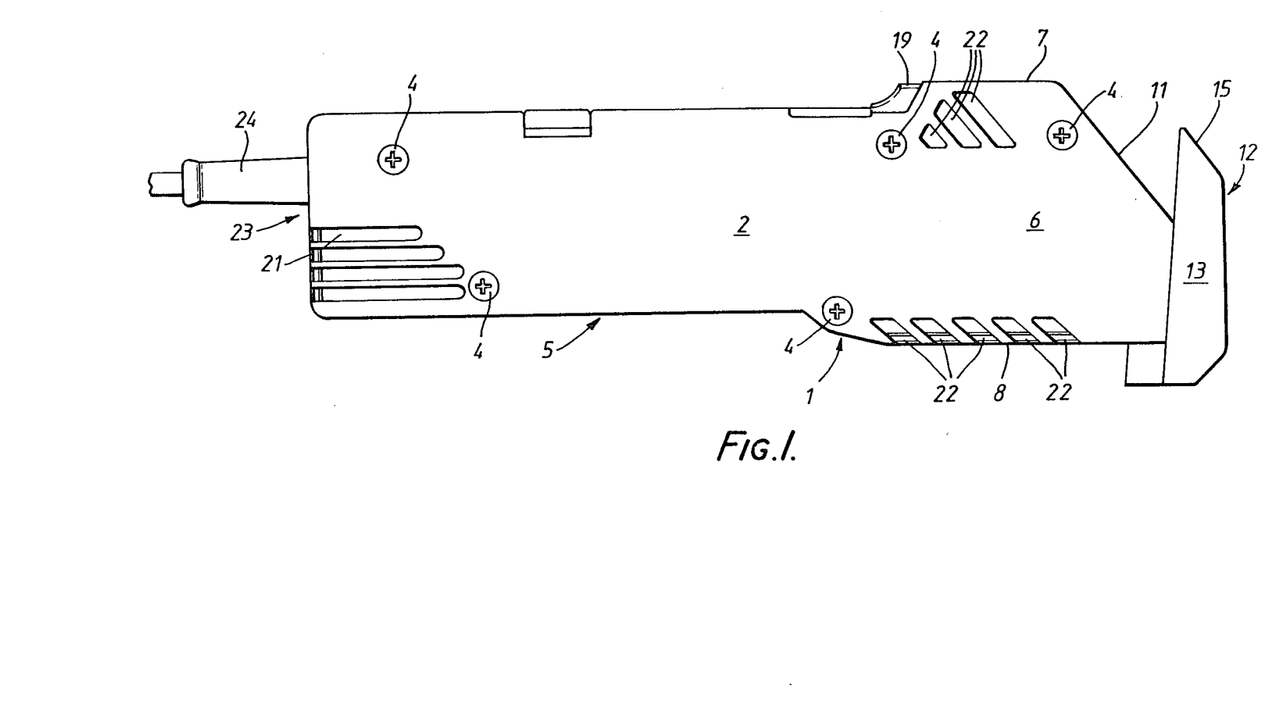
FIG. 1 is a side view of the embodiment.
Figure 2:
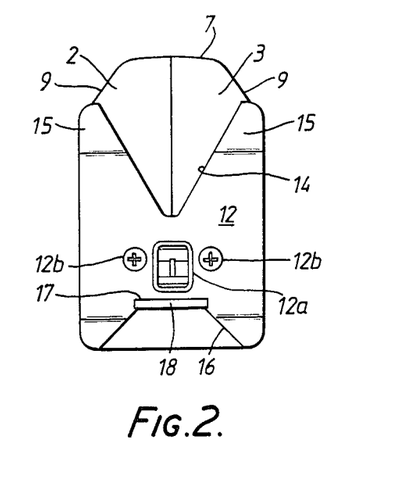
FIGS. 2 and 3 are, respectively, a front end view and a rear end view.

The guard 12 is of generally rectangular form when seen in front elevation as in FIG. 2 with side walls 13. The guard has a deep V-shaped slot 14, the upper portions of the front wall adjacent the upper part of the slot being inclined backwardly as shown at 15 to allow a user a better view of a work area than that provided by the slot 14 alone.

The lower (as viewed in FIG. 2) edge of the guard is also slotted as at 16, the upper edge of the slot being contoured as at 17 to allow movement of a cover 18 referred to in greater detail below.

The guard 12 also has, in its front face, a hole 12a of generally rectangular shape, the hole being positioned just below the tip of the slot 14. The guard is secured to the casing by screws 12b.

The hole 12a is aligned with a hole (not shown) in the flat nose of the casing behind the guard 12.

Extending through an aperture in the upper part of the casing is a slide button 19, movement of which controls the operation of an ON-OFF switch located inside the casing and shown in FIG. 4 as block 20 and referred to below. The slide button 19 is so located as to be conveniently operated by the thumb of the hand grasping the rear portion 5. The button 19 may be provided with a "lock-off" control (not shown).

Portion 5 also has air intake slots 21 whilst portion 6 has air exit slots 22. The rear wall 23 of the casing is formed to receive a cable protector 24 through which extends a power cable whose end is secured inside the casing by means of a cable clamp indicated at 25.

Figure 4:
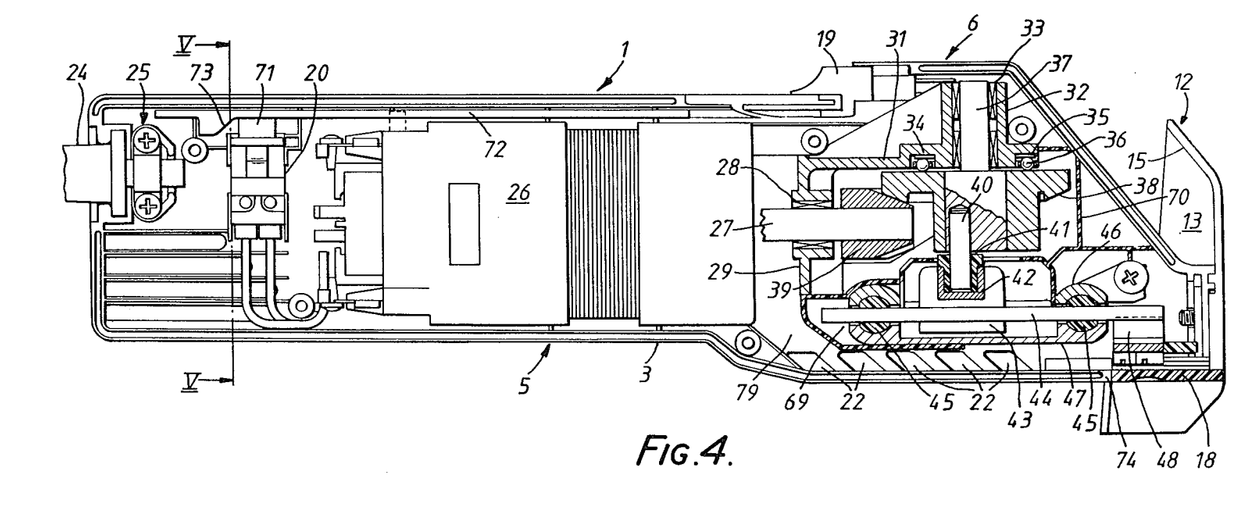
FIG. 4 is a side view with a cover part removed and certain components shown in section.
Figure 5:
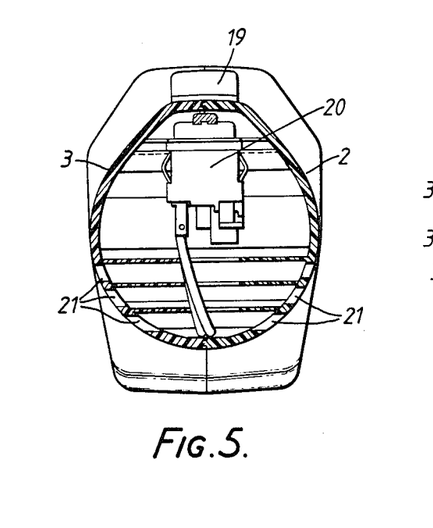
FIG. 5 is a section on the line V—V of FIG. 4.
Figure 6:
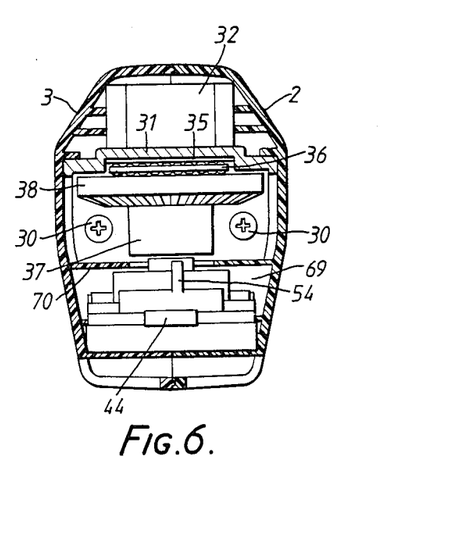
FIG. 6 is a schematic end view of part of the mechanism of the embodiment.
Figure 7:
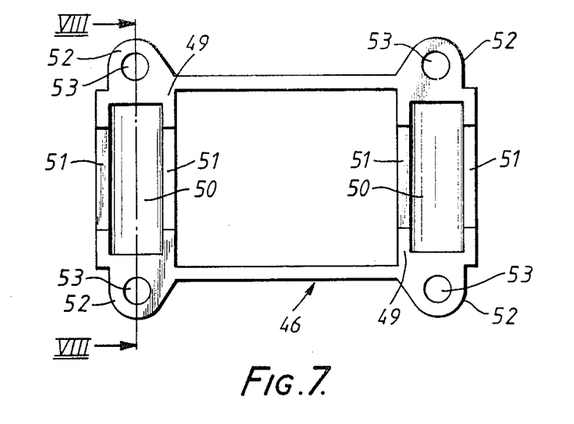
FIG. 7 is a plan view of a component.
Figure 8:
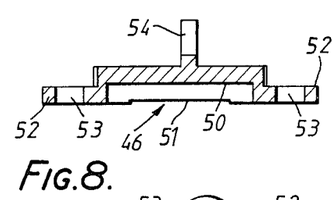
FIG. 8 is a section on the line VIII—VIII of FIG. 7.
Figure 9:
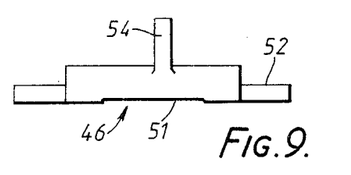
FIG. 9 is an end view of the component of FIG. 7.
Figure 10:
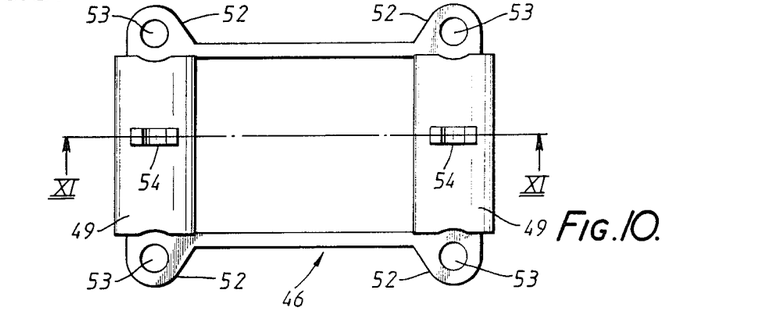
FIG. 10 is an underneath view of the component of FIG. 7.
Figure 11:
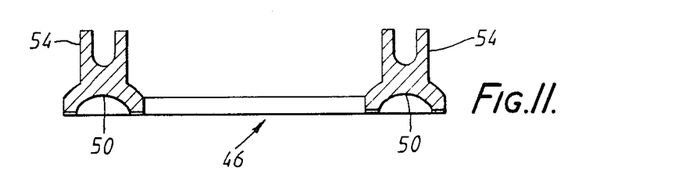
FIG. 11 is a section on the line XI—XI of FIG. 10.
Figure 12:
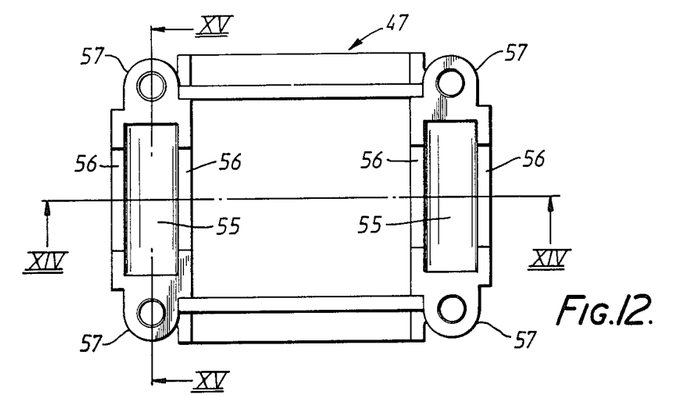
FIG. 12 is a plan view of another component.
Figure 13:
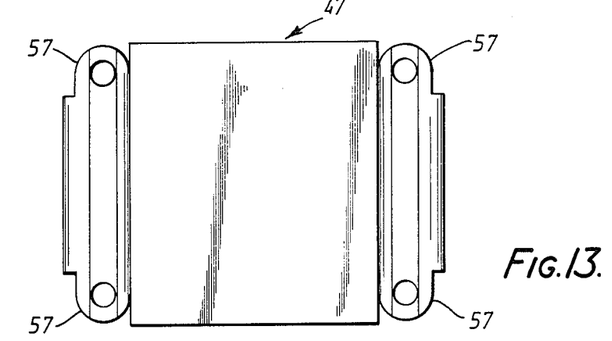
FIG. 13 is an underneath view of the component of FIG. 12.
Figure 14:
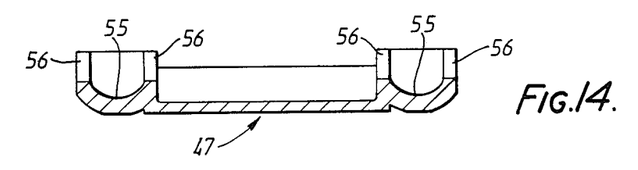
FIG. 14 is a section on the line XIV—XIV of FIG. 12.
Figure 15:
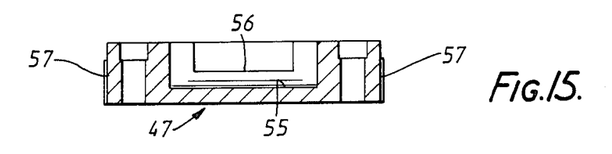
FIG. 15 is a section on the line XV—XV of FIG. 12.

FIG. 4 shows the tool with one body half removed to reveal the components housed within the casing. The body half shown in FIG. 4 has internal ribs that support an electric motor unit 26 disposed longitudinally within the rear portion 5 of the casing. The motor unit has an armature whose axis of rotation lies along the longitudinal axis of the rear portion 5. The motor unit is a commutator motor, the commutator end of the motor being located adjacent the switch 20. The armature shaft 27 of the motor is operatively connected to a drive transmission system and extends through bearings 28 carried by a support bracket 29 secured to the forward end of the motor unit by screws 30 (FIG. 6).

The bracket 29 has an arm 31 with an integral tubular extension 32 carrying a bearing 33. The arm 31 is also formed at 34 to accommodate a thrust ring 35 and a ball bearing race 36.

Bearing 33 supports the reduced diameter end of a shaft 37 carrying a bevel pinion 38 in mesh with a bevel gear 39 secured to the end of the armature shaft 27 as shown in FIG. 4. The upper face of the pinion 38 is in contact with the ball bearings of the race 36 which thus supports axial loads along the shaft 37. The larger diameter lower end (as seen in FIG. 4) of shaft 37 has a pin 40 projecting from its lower race, the pin being located eccentrically of the axis of rotation of the shaft 37.

Pin 40 extends into a tubular roller 41 stepped externally to seat upon the upper edge of a liner element 42 seated in a drive member 43 secured to a reciprocable shaft 44 described in more detail below.

The shaft 44 is supported for reciprocatory movement in slots in cylindrical sintered bearings 45 held between upper and lower support structures 46 and 47. Secured to the forward end of the shaft 44 is a clamp 48 by which a cutting tool to be described below can be secured to the shaft for reciprocation therewith. The tool projects from the front of the guard 12 through the aperture 12a therein.

The upper support structure 46 is shown in FIGS. 7–11. It comprises a cast metal frame of generally rectangular shape when seen in plan as in FIG. 7. End members 49 of the frame are contoured to provide curved support surfaces 50 for the bearings 45 and guides 51 for the shaft 44. The end members 49 extend sideways to form ears 52 each of which has a hole 53 for a fixing screw not shown. From the upper faces of the side members 49 project U-shaped prongs 54 which serve to locate the support structure and which engage internal surfaces (not shown) on the body halves 2, 3.

The lower support structure 47, also a metal casting, is shown in FIGS. 12–15. In plan view, structure 47 is also of generally rectangular form, is sized to match structure 46, and has curved lower support surfaces 55 for bearings 45 and with guides 56 for shaft 45. The structure 47 has ears 57 in positions corresponding with ears 52 of structure 46. Each ear 57 has a hole 58.

Figure 16:
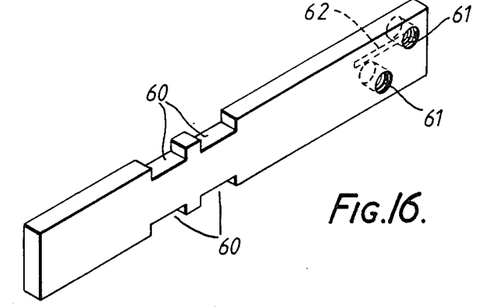
FIG. 16 is a perspective view of a further component.
Figure 17:
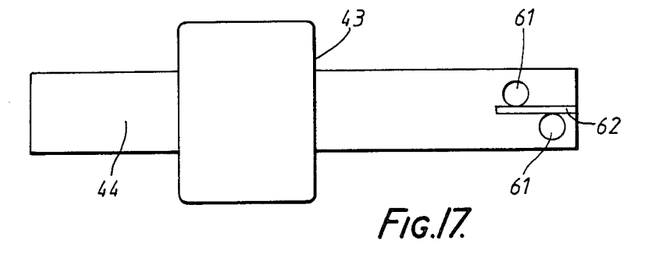
FIG. 17 is an underneath view of an assembly including the component of FIG. 16.
Figure 18:
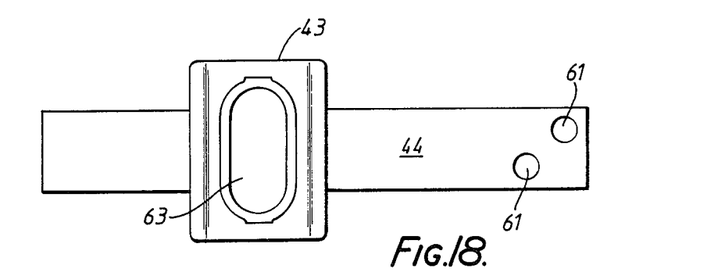
FIG. 18 is a plan view of the assembly of FIG. 17.

Shaft 44 is shown in more detail in FIGS. 16–18 and it consists of a metal strip with slots 60 in its side walls about midway of the length of the strip and screw holes 61 close to one end. The holes 61 are staggered and between them on one face of the strip is a narrow slot 62.

Moulded on to the strip in a position allowing it to key into the slots 60 is the drive member 43 which is of a plastics material. The upper face of the drive member 43, visible in FIG. 18, has a central elongate cavity 63 lying transverse to the length of the strip 44. The inner element 42 referred to above seats in the cavity 63 as is shown in FIG. 4.

Figure 19:
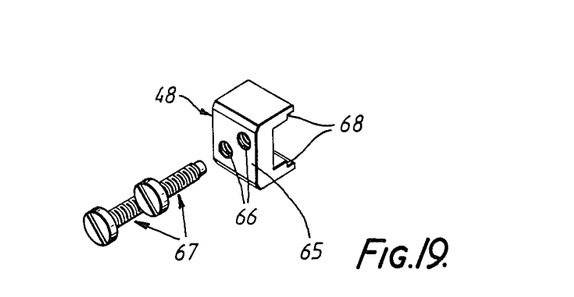
FIG. 19 is a perspective exploded view of another component, FIG. 20. is a side elevation of a cutting tool.

Attached at one end of the shaft 44 is clamp 48 FIG. 19). The clamp comprises a U-shaped block. The base 65 of the block has holes 66 for screws 67 by means of which the clamp is secured to the shaft. The ends of the limbs of the U are stepped as at 68 so that they seat on the edge of the strip.

When assembled as shown in FIG. 4, the support structures 47 and 46 house the bearings 45 and are secured together by screws through the holes in the ears referred to above. The shaft 44 is located in the slots in the bearings 45 and is orientated so that the end carrying the clamp 48 is adjacent the front end wall of the tool casing and the longitudinal axis of the shaft is aligned with the hole in the front face of the casing and the hole 12a.

The facing surfaces of the body halves are contoured to provide, when the halves are placed together a compartment 69 housing the support structures 44, 46 and dividing walls 70 that separate those structures of the spur gear 39 and pinion 38. This reduces the tendency for lubricants to migrate from the gears to the compartment 69.

The power cable referred to above enters the tool casing through the protector 24 and its conductors are connected to the terminal of the switch 20. Switch 20 has an actuating plunger 71, movement of which to actuate the switch contacts is controlled by a slide 72 that extends, inside the tool casing, from the slide button 19. The slide 72 has a cam surface 73 shaped to depress the plunger 71 when the slide button 19 is moved in one direction and allows the plunger to restore when moved in the other direction. The slide 72 is supported by guide surfaces formed on the facing inner surfaces of the body halves. The switch 20 is supported in a similar manner.

Formed between the body halves at the front end of the casing is an opening 74 aligned with the clamp screws. The opening 74 is normally closed by the slide 18 referred to above. To expose the opening, the slide 18 is moved forwardly.

The tool can be used for a variety of cutting purposes for each of which a particular cutter is used. Examples of cutters are shown in FIGS. 20-26.

Figures 20, 21:
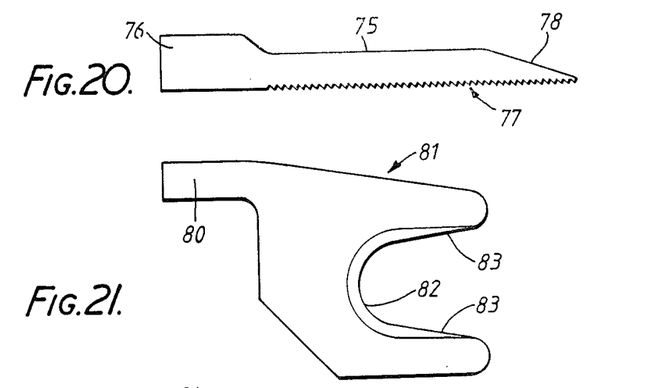

FIG. 20 is a side elevation of a saw blade 75. The blade has a stem 76 by means of which it can be mounted in the clamp 48 and teeth 77 along one edge. The blade has a tapered tip 78. The teeth 77 have cutting edges on both sides so that the saw cuts on both forward and reverse movements.

To mount the blade, a user moves the slide 18 to expose the opening 74 and thereby to gain access to the screws 67. The saw blade is then entered, stem first, through the opening 12a in the guard 12 and the stem engaged, edge on, in the slot 62. Screws 67 are then tightened to clamp the stem in the slot 62.

After connection of the power lead to a power supply, operation of slide button 19 operates switch 20 to energise the motor. Rotation of the spur gear 39 is transmitted to pin 40 which, with drive member 43, acts in the manner of a scotch yoke drive to reciprocate shaft 44.

The speed of rotation of the shaft 27 in conjunction with the reduction ratio between gears 38, 39 and the "throw" of the eccentricity of pin 40 are such that shaft 44 reciprocates at a rate of about 10,000 movements per minute with a stroke of about 8 mm. A movement is defined as a forward and backward action of the blade.

That high speed of reciprocation combined with the short stroke produces a rapid cutting action with little or no vibration.

The saw blade will cut most types of material especially those of a thickness of 16 mm or less. It is, however, capable of cuts up to 30 mm. Debris created during cutting is cleared from the work area by air exhausting through exits 22 via a channel 79 formed between the clam shell halves.

The saw blade can also be used for so called plunge cutting when the saw is used to cut directly into a surface and not on the edge thereof. Such cutting action is not accompanied by any "kick-back".

The tool can also be used with a blade type cutting tool of which examples are shown in FIGS. 21-26.

The cutter shown in FIG. 21 has a stem 80 by which the tool is clamped to the shaft 44 in the manner described above. From the stem extends a U-shaped jaw 81 with a cutting edge formed round the base of the U at 82 and along the inside edges of the limbs thereof at 83. The cutting edges 83 are tapered somewhat as shown.

The cutter shown in FIG. 21 is used to cut flexible materials for example carpets, carpet tiles, vinyl type floor coverings, plastics sheeting, rubber sheeting and cloth.

The edge of the material to be cut is entered between the jaws and the tool switched on. The rapid reciprocation of the edge 82 of the cutting tool and the short stroke produces a rapid cutting action.

It will be appreciated that the edge 82 lies at right angles to the direction of reciprocation and it is this edge that performs the cutting. Edges 83 assist in guiding the tool along a cutting line. Edge 82 is rapidly reciprocated towards and away from the material being cut.

Figure 22:
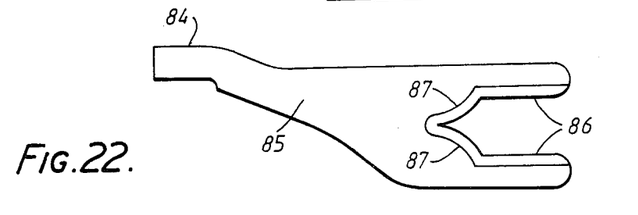
Figure 23:
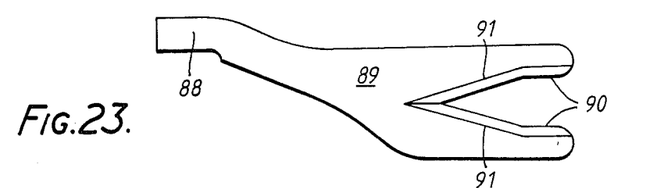
Figure 24:
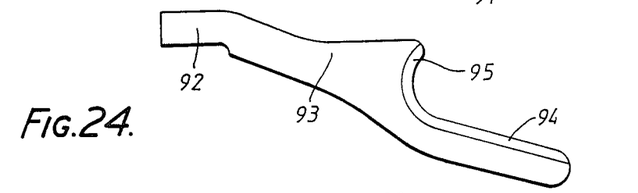

Other configurations of cutting blade are shown in FIGS. 22-24.

The blade shown in FIG. 22 has a stem 84 and a U-shaped jaw 85. The jaw has parallel cutting edges 86 on the inside edges of the limbs of the U and arcuate cutting edges 87 at the base.

Material to be cut is fed into the jaws and cut by the to and fro reciprocation of the edges 87. The edges 87 are inclined to the direction of reciprocation of the cutting blade.

The cutting blade shown in FIG. 23 has a stem 88 and a U-shaped jaw 89. Short parallel cutting edges 90 are formed at the outer ends of the facing edges of the jaw whilst longer convering cutting edges 91 are formed over the remainder of those facing edges. Cutting is performed by the rapid reciprocation of the edges 91 towards and away from the surface to be cut. Those edges are inclined to the direction of reciprocation thereof.

The cutting blade shown in FIG. 24 has a stem 92 and a single cutting limb 93 inclined downwardly as shown. The upper edge of the limb has a straight cutting edge 94 and an upwardly curved edge 95.

The blade shown in FIG. 24 can be used in conditions where the material to be cut is laid on a flat surface and the limb 93 can be inserted beneath the material. Cutting is principally effected by edge 95 which lies generally at right angles to the direction of reciprocation.

Figure 25:
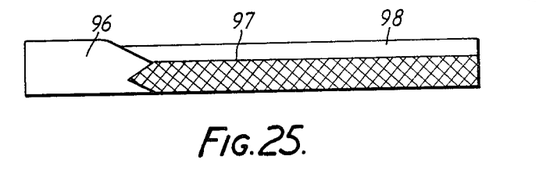
FIGS. 25 and 26 are, respectively, a side elevation and end view of another form of cutting tool.
Figure 26:
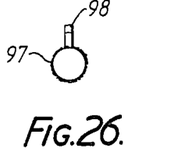

The tool shown in FIGS. 25 and 26 has a stem 96 from which extends a rod 97 faced with an abrasive material. The rod 97 is strengthened by a longitudinal fin 98 as shown.

The tool of FIGS. 25 and 26 is used to cut ceramic materials, and plaster materials and like relatively brittle substances. It can be used to cut tiles. The tool acts rather as a high speed file.

If desired, a motor control circuit can be provided to give a two speed operation of the motor. For example, a higher speed giving the 10,000 reciprocatory movements mentioned above and a lower speed giving 8,500 such movements. The user is then able to select the speed best suited to the cutting he requires to do. For example, the higher speed will be suitable for materials such as wood and the lower speed will be suitable for metals. In both cases, the stroke is 8 mm.

These speeds, surprisingly, provide effective cutting without, at the same time, producing overheating of the cutting tool. In addition, the degree of vibration experienced by the user holding the tool is small.

Equally surprising, it has been established that there is a limited range of values for the reciprocatory movement of the cutting tool as for the stroke of the latter within which effective cutting action is obtained without overheating and an unacceptable degree of tool vibration.

The range of reciprocatory movement is from a minimum of 4,000 reciprocatory movements per minute to a maximum of 12,000 movements per minute in conjunction with a stroke lying within the range of from 4–12 mm.

At speeds much below 4,000, effective cutting is not achieved because the reaction goes into the body of the tool and not into the material that is to be cut. At speeds much above 12,000, it is found that overheating of the cutting tool occurs and damage results to the material being cut.

Preferably, a range of from 8,500 to 10,000 reciprocatory movements per minute is used.

The stroke of the cutting tool is preferably in the range of from 6 to 10 mm.

At strokes much below 4 mm, it is found that cutting does not take place, whilst at strokes much above 12 mm, vibration of the tool becomes excessive.

It will be appreciated that the tool does not have to be hand-held, it can be mounted upon a stand for use as a stationary tool upon a bench or other work surface.

It will also be noticed that with the cutting blades of FIGS. 21 to 24, the limb or limbs of each blade, together with the V-shaped or curved cutting edge portion, are disposed below the stem of the cutting blade. That is, these specially shaped blades have the cutting and limb edges displaced to one side of the axis along which the blade stem is reciprocated. This facilitates cutting and provides better cutting control.

The above described embodiments, of course, are not to be construed as limiting the breadth of the present invention. Modifications, and other alternative constructions, will be apparent which are within the spirit and scope of the invention as defined in the appended claims.

What is claimed is:

1. A power tool, comprising:
   a hand-holdable housing:
   a motor disposed in said housing;
   a reciprocating output drive member including means for securing to said member a cutting blade for reciprocation by said member;
   drive transmission means, disposed in said housing and drivingly connected between said motor and said output drive member, for reciprocating said output drive member at a rate in the range of 4,000 to 12,000 reciprocatory movements per minute with a stroke in the range of 4 to 12 mm;
   said output drive member being accommodated entirely within said housing and remaining so during said reicprocatory movements;
   said output drive member being aligned with an aperture in a forward face of said housing, and said securing means comprising a clamp adjacent said forward face at one end of said output drive member;
   said housing having an opening therein, spaced from said aperture, adjacent said clamp to give access to the latter; and
   said housing including a manually operable slide movable between a position in which said opening is exposed and another position in which the slide covers said opening.

2. The tool of claim 1, wherein said housing comprises a cylindrical portion sized to allow a user to hold and manipulate the tool during use by grasping the cylindrical portion in one hand.

3. The tool of claim 2, wherein the cylindrical portion accommodates the motor, an axis of rotation of the motor being coaxial with a central longitudinal axis of the cylindrical portion.

4. The tool of claim 3, wherein said output drive member reciprocates along an axis parallel to said central axis.

5. The tool of claim 4, wherein said drive transmission means includes a bracket rotatably supporting an eccentric by means of which reciprocatory movement is imparted to said output drive member.

6. The tool of claim 5, wherein said bracket also supports a thrust bearing for supporting any axial load applied to said eccentric.

7. The tool of claim 5, wherein said output drive member is mounted for reciprocatory movement in spaced bearings, the bearings being supported by a support structure comprising two separable members, each separable member having spaced apart support surfaces in which the bearings are located.

8. A power padsaw, comprising:
   a housing having a main longitudinal cylindrical portion graspable in the palm of one hand of a user;
   said housing including a forward portion having a front wall with an aperture through said front wall;
   an electric motor mounted inside asaid cylindrical portion with a rotational axis of the motor extending in the same direction as a central longtitudinal axis of said cylindrical portion;
   a motor pinion secured on a forward end of an armature shaft of said motor;
   a bevel pinion mounted for rotation about an axis at right angles to said rotational axis and in meshing engagement with said motor pinion, said pinions being disposed in said housing forward portion;
   an eccentric pin mounted on said bevel pinion;
   a blade carrying and driving member mounted in said housing forward portion in two spaced apart bearings for reciprocation along an axis parallel to but spaced from said rotational axis;
   a channel in said member transverse to said rotational axis, said pin engaging in said channel to drivingly reciprocate said member in said bearings;
   said member being disposed completely inside said housing forward portion during reciprocation thereof, and a forward end of said member being aligned with and adjacent said aperture;
   a blade clamp carried by said member at said forward end;
   an opening in a bottom wall of said housing forward portion providing access to said clamp for releasably securing a cutting blade therein;
   a cover attached to said housing forward portion and movable between a position closing said opening and a position revealing said opening; and
   said motor, said meshing pinions, and said eccentric pin providing reciprocation of said blade carrying and driving member at a rate in the range of 4,000 to 12,000 reciprocations per minute and with a stroke of reciprocation in the range of 4 to 12 mm.

9. The power padsaw of claim 10, further comprising a cutting blade secured in said clamp and extending forwardly through said aperture, said blade having at a forward end two spaced apart limbs having facing cutting edges connected rearwardly by a further cutting edge.

10. The power padsaw of claim 9, wherein said further cutting edge is curved, and said facing cuttting edges together with said further cutting edge form a U-shape.

11. The power padsaw of claim 9, wherein said facing cutting edges are parallel, and said further cutting edge is of V-shaped configuration.

12. The power padsaw of claim 8, wherein said housing cylindrical portion has air intake slots therein, and said housing forward portion has air exit slots therein, a passageway in said housing forward portion communicating between said motor and said exit slots.

13. The power padsaw of claim 8, wherein an on/off switch for said motor is located in said housing cylindrical portion rearwardly of said motor, a switch actuating button is slidably mounted in said housing adjacent a forward end of said housing cylindrical portion, a slide is connected at a forward end to said button and extends rearwardly between said housing cylindrical portion and said motor to said switch, and an actuating plunger adjacent a rear end of said slide cooperates with said switch for actuation thereof by movement of said button.

14. The power padsaw of claim 13, further comprising a power cable connected to said switch and extending through a rear wall of said housing, and a guard connected to said housing forward portion in front of said front wall, said guard having a hole therein aligned with said aperture, and said guard having a V-shaped slot extending downwardly to adjacent said hole to provide a user a view of a workpiece being cut.

15. A hand-holdable power cutting tool, comprising:
a housing having a longitudinal cylindrical portion graspable in one hand of a user;
said housing including an enlarged forward portion having a downwardly and forwardly inclined front wall with an aperture adjacent a lower edge of said front wall;
a guard mounted on said housing forward portion in front of said front wall, said guard having a hole therethrough aligned with said aperture, a portion of said guard below said hole having a cut-out and extending below said housing forward portion, a portion of said guard above said hole having a V-shaped slot extending downwardly from a top of the guard to adjacent said hole, an upper portion of said guard being inclined upwardly, and rearwardly;
an electric motor mounted inside said cylindrical portion and having an armature shaft extending along a central axis of said cylindrical portion;
an on/off switch in said housing for said motor, an actuator for said switch being located adjacent a junction between said housing cylindrical and forward portions;
a blade carrying and driving member mounted in said housing forward portion for reciprocation along an axis parallel to but spaced below said central axis, said member including at a forward end a blade clamp and being disposed completely inside said housing, said blade clamp being aligned with said aperture and said hole;
an opening in a bottom wall of said housing forward portion to provide access to said blade clamp for releasably securing a cutting blade therein;
said housing cylindrical portion having air intake slots therein adjacent a rear end thereof, said housing forward portion having air exit slots in a lower portion thereof, a passageway in said housing forward portion communicating between said motor and said air exit slots; and
means, disposed in said housing forward portion and connected between said motor and said blade carrying and driving member, for converting rotary motion to reciprocating motion and for effecting reciprocation of said member by said motor at a rate in the range of 4,000 to 12,000 reciprocations per minute and with a stroke of reciprocation in the range of 4 to 12 mm.

16. The tool of claim 15, wherein said means causes said motor to reciprocate said blade carrying and driving member at a rate in the range of 8,500 to 10,000 reciprocations per minute and with a stroke of reciprocation in the range of 6 to 10 mm.

17. A power tool, comprising:
a hand-holdable housing;
a motor disposed in said housing;
a reciprocating output drive member including means for releasably securing to said member a cutting blade for reciprocation by said member;
a transmission drivingly connected between said motor and said drive member to effect reciprocation of said drive member by said motor;
said drive member bearing disposed in a forward portion of said housing and being aligned with an aperture in a forward face of said housing forward portion;
said housing forward portion having an opening wherein in addition to said aperture, said opening being adjacent and providing access to said securing means;
a cover supported by said housing and movable between a position closing said opening and a position revealing said opening;
a guard connected to said housing forward portion in front of said forward face;
said guard having a hole therein aligned with said aperture; and
said guard having a V-shaped slot extending downwardly from a top of said guard to adjacent said hole to provide a user a view of a workpiece being cut.

18. A power tool, comprising:
a hand-holdable housing;
a motor disposed in said housing;
a reciprocating output drive member including means for releasably securing to said member a cutting blade for reciprocation by said member;
a transmission drivingly connected between said motor and said drive member to effect reciprocation of said drive member by said motor;
said drive member being disposed in a forward portion of said housing and being aligned with an aperture in a forward face of said housing forward portion;
said housing forward portion having an opening therein in addition to said aperture, said opening being adjacent and providing access to said securing means;
a cover supported by said housing and movable between a position closing said opening and a position revealing said opening;
a guard mounted on said housing forward portion in front of said forward face;
said guard having a hole therethrough aligned with said aperture;

a portion of said guard below said hole having a cutout and extending below said housing forward portion;

another portion of said guard above said hole having a V-shaped slot extending downwardly from a top of said guard to adjacent said hole; and an upper portion of said guard being inclined upwardly and rearwardly.

19. A power padsaw, comprising:

a housing having a main longitudinal portion graspable in the palm of one hand of a user;

said housing including a forward portion having a front wall with an aperture through said front wall;

an electric motor mounted inside said main portion with a rotational axis of the motor extending in the same direction as a central longitudinal axis of said main portion;

a motor pinion on a forward end of an armature shaft of said motor;

a bevel pinion mounted for rotation about an axis at right angles to said rotational axis and in meshing engagement with said motor pinion, said pinions being disposed in said housing forward portion;

an eccentric pin mounted on said bevel pinion;

a blade carrying and driving member mounted in said housing forward poriton for reciprocation along an axis parallel to but spaced from said rotational axis;

a channel in said member transverse to said rotational axis, said pin engaging in said channel to drivingly reciprocate said member;

said member being disposed completely inside said housing forward portion during reciprocation thereof, and a forward end of said member being aligned with and adjacent said aperture;

a blade clamp carried by said member at said forward end;

an opening in a wall of said housing forward portion providing access to said clamp for releasably securing a cutting blade therein; and a cover attached to said housing forward portion and movable between a position closing said opening and a position revealing said opening.

* * * * *